US011339696B2

(12) United States Patent
Fey et al.

(10) Patent No.: US 11,339,696 B2
(45) Date of Patent: May 24, 2022

(54) METHOD AND DEVICE FOR DIAGNOSING COMPONENTS OF AN EXHAUST GAS SYSTEM IN AN ENGINE SYSTEM THAT INCLUDES AN INTERNAL COMBUSTION ENGINE

(71) Applicant: Robert Bosch GmbH, Stuttgart (DE)

(72) Inventors: Michael Fey, Wiernsheim (DE); Bernd Kraewer, Winnenden (DE); Maik Unverricht, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 16/806,182

(22) Filed: Mar. 2, 2020

(65) Prior Publication Data
US 2020/0284177 A1     Sep. 10, 2020

(30) Foreign Application Priority Data
Mar. 7, 2019   (DE) ...................... 10 2019 203 093.9

(51) Int. Cl.
*F01N 3/20*     (2006.01)
(52) U.S. Cl.
CPC ...................... *F01N 3/20* (2013.01)
(58) Field of Classification Search
CPC .......... F01N 2430/06; F01N 2560/025; F01N 2900/08; F01N 2900/1614; F01N 2900/1624; F01N 3/101; F01N 3/20; F02D 2200/0814; F02D 2041/1433; F02D 41/0295
See application file for complete search history.

(56) References Cited

U.S. PATENT DOCUMENTS

| 8,235,026 | B2 * | 8/2012 | Yamaguchi | ........... | F02D 41/065 |
| | | | | | 123/491 |
| 2002/0121083 | A1 * | 9/2002 | Lindner | .............. | F02D 41/1408 |
| | | | | | 60/277 |
| 2006/0288801 | A1 * | 12/2006 | Graze, Jr. | ............ | G01N 1/2252 |
| | | | | | 73/863.02 |
| 2013/0283783 | A1 * | 10/2013 | Sato | ........................ | F02B 37/18 |
| | | | | | 60/603 |
| 2016/0108836 | A1 * | 4/2016 | Odendall | ............ | F02D 41/1441 |
| | | | | | 60/274 |

FOREIGN PATENT DOCUMENTS

DE     19606652 B4     2/2004

* cited by examiner

*Primary Examiner* — Anthony Ayala Delgado
(74) *Attorney, Agent, or Firm* — Norton Rose Fulbright US LLP; Gerard Messina

(57) ABSTRACT

A method for operating an engine system that includes an internal combustion engine and an exhaust aftertreatment device. The method includes: carrying out a filling control in order to regulate a filling level of the exhaust aftertreatment device as a function of a predefined filling level setpoint value, a lambda setpoint value for a lambda regulation being predefined as a manipulated variable, adapting the filling control with the aid of an adaptation variable that indicates a correction value for the lambda setpoint value, and storing an adaptation value as a function of an operating range of the engine system, the adaptation value in question being updated with the value of the adaptation variable for the instantaneous operating range.

9 Claims, 2 Drawing Sheets

METHOD AND DEVICE FOR DIAGNOSING COMPONENTS OF AN EXHAUST GAS SYSTEM IN AN ENGINE SYSTEM THAT INCLUDES AN INTERNAL COMBUSTION ENGINE

CROSS REFERENCE

The present application claims the benefit under 35 U.S.C. § 119 of German Patent Application No. DE 102019203093.9 filed on Mar. 7, 2019, which is expressly incorporated herein by reference in its entirety.

FIELD

The present invention relates to engine systems that include internal combustion engines, in which combustion exhaust gases are purified with the aid of an exhaust aftertreatment device. Moreover, the present invention relates to a filling control for an exhaust aftertreatment device, and the adaptation of a lambda regulation for the internal combustion engine.

BACKGROUND INFORMATION

A method is described in German Patent No. DE 196 06 652 B4 in which an actual filling level of the exhaust gas component store is ascertained using a first system model, which is supplied with signals of a first exhaust gas sensor situated upstream from the catalytic converter, and a second exhaust gas sensor situated downstream from the catalytic converter, a base lambda setpoint value for a first control loop being predefined by a second control loop, and being adapted to the actual filling level via the actual filling level that is ascertained with the first system model, when the voltage of the second exhaust gas sensor indicates a breakthrough of rich or lean exhaust gas downstream from the catalytic converter, and thus an excessively low or excessively high actual filling level of the exhaust gas component store.

When there is incomplete combustion of the air-fuel mixture in a gasoline engine, in addition to nitrogen (N2), carbon dioxide (CO2), and water (H2O), numerous combustion products are emitted, for which regulatory limits are specified for hydrocarbons (HC), carbon monoxide (CO), and nitrogen oxides (NOx). According to today's state of the art, the applicable exhaust gas emission limits for motor vehicles can be met only with catalytic exhaust aftertreatment. The stated pollutant components may be converted by using a three-way catalytic converter. At the same time, a high conversion rate for HC, CO, and NOx is achieved with three-way catalytic converters only in a narrow lambda range around the stoichiometric operating point (lambda=1), the so-called conversion window.

For operating the three-way catalytic converter in the conversion window, in present engine control systems a lambda regulation based on the signals of lambda sensors situated upstream and downstream from the three-way catalytic converter is typically used. For regulating the air ratio lambda, which is a measure for the composition of the fuel/air ratio of the internal combustion engine, the oxygen content of the exhaust gas upstream from the three-way catalytic converter is measured using a front lambda sensor situated at that location. As a function of this measured value, the regulation corrects the fuel quantity, in the form of a base value, which is predefined by a pilot control function.

Within the scope of the pilot control, base values of fuel quantities to be injected are predefined as a function of, for example, the speed and the load of the internal combustion engine. For an even more accurate regulation, in addition the oxygen concentration of the exhaust gas downstream from the three-way catalytic converter is detected using a further lambda sensor. The signal of this downstream lambda sensor is used for a control regulation that is superimposed on the lambda regulation, upstream from the three-way catalytic converter, that is based on the signal of the upstream lambda sensor.

SUMMARY

According to the present invention, an example method for diagnosing an exhaust gas discharge system in an engine system that includes an internal combustion engine, an example device and an example engine system are provided.

Further embodiments of the present invention are described herein.

According to a first aspect of the present invention, an example method for operating an engine system that includes an internal combustion engine and an exhaust aftertreatment device in an exhaust gas discharge system is provided, including the following steps:
  carrying out a filling control in order to regulate a filling level of the exhaust aftertreatment device as a function of a predefined filling level setpoint value, a lambda setpoint value for a lambda regulation being predefined as a manipulated variable;
  adapting the filling control with the aid of an adaptation variable that indicates a correction value for the lambda setpoint value,
  storing an adaptation value as a function of an operating range of the engine system, the adaptation value in question being updated with the value of the adaptation variable for the instantaneous operating range.

In addition, for operating the internal combustion engine, the filling control may be adapted as a function of the associated stored adaptation value for the operating range of the internal combustion engine.

The above method for operating an engine system that includes an internal combustion engine and an exhaust aftertreatment device in an exhaust gas discharge system is based on a filling control of an average oxygen filling level of the exhaust aftertreatment device. However, the average filling level is not measurable, and may be modeled only with the aid of a suitable system model.

The above method provides for buffering the adaptation values for various operating ranges of the internal combustion engine and directly applying them when the operating range of the internal combustion engine changes. The adaptation of the filling control may thus be applied immediately, not just after a dead time of the controlled system, resulting in improved emission performance, in particular in dynamic operation.

It may be provided that the adaptation of the filling control is carried out continuously. In conjunction with the buffering, this allows a decoupling of the adaptation and the regulation from a diagnostic function based on an evaluation of the adaptation values.

According to one specific embodiment of the present invention, the operating range may be indicated as a function of one or multiple of the following variables: load, engine speed, and engine temperature.

According to another aspect of the present invention, an example method for diagnosing components of an exhaust gas discharge system is provided, including the following steps:

carrying out the above method;

associating an error in the exhaust gas discharge system as a function of the adaptation values that are stored for the operating ranges of the internal combustion engine.

Due to errors in the exhaust gas discharge system and tolerances of input variables of the system model and of the system model, deviations may occur between the variables that are modeled with the aid of the system model (for example, oxygen filling level of the catalytic converter) and the corresponding actual variables. In particular, errors in the exhaust gas discharge system result in systematic deviations of the adaptation variable, regardless of the operating range of the internal combustion engine.

Therefore, there is a need for providing an option for discerning the reason for the need for adapting a model-based filling control of the exhaust aftertreatment device to allow an affected component to be replaced during maintenance. The above method provides a filling control for an exhaust aftertreatment device based on a lambda regulation. The lambda regulation includes an operating point-dependent adaptation of the filling control and a diagnosis of the exhaust gas discharge system based on stored adaptation values. The diagnosis of the components in the exhaust gas system based on the operating range-dependent stored adaptation values allows significant decoupling of the regulation and adaptation from the diagnosis, so that separate diagnostic methods must be carried out. In addition, the recognition of systematic adaptation values and operating point-specific adaptation values allows a differentiation between systematic errors in the exhaust gas discharge system and model inaccuracies of the filling model.

In addition, a self-adjustment may be carried out for an exhaust gas sensor situated upstream from the exhaust aftertreatment device in order to obtain an exhaust gas sensor offset, via which the lambda value provided to the lambda regulation is corrected, the adaptation values that are stored for the operating ranges being corrected as a function of the exhaust gas sensor offset to obtain particular fuel trim values that are used as remaining adaptation values for the filling control, a systematic error in the exhaust gas discharge system being recognized when an average value of the fuel trim values is greater than a predefined threshold value, and/or a model inaccuracy of a filling model, based on the filling control, being recognized when a deviation of the adaptation values from an average value of the adaptation values exceeds a predefined threshold value.

For a provided self-adjustment of the exhaust gas sensor, a systematic adaptation variable may be corrected with a self-adjustment value (exhaust gas sensor offset) of the exhaust gas sensor, so that the adaptation variable minus the ascertained exhaust gas sensor offset of the exhaust gas sensor may be ascertained as operating point-dependent fuel trim adaptation values. The fuel trim adaptation values may thus be used for continuously diagnosing components of the exhaust gas system. In particular, errors such as a leak in the exhaust gas system or a model inaccuracy of the filling model may be recognized based on the fuel trim adaptation variable.

According to another aspect of the present invention, an example device, in particular a control unit, for operating an engine system that includes an internal combustion engine and an exhaust aftertreatment device is provided, the device being designed for:

carrying out a filling control in order to regulate a filling level of the exhaust aftertreatment device as a function of a predefined filling level setpoint value, a lambda setpoint value for a lambda regulation being predefined as the manipulated variable;

adapting the filling control with the aid of an adaptation variable that indicates a correction value for the lambda setpoint value, and storing an adaptation value as a function of an operating range of the engine system, the adaptation value in question being updated with the value of the adaptation variable for the instantaneous operating range.

BRIEF DESCRIPTION OF THE DRAWINGS

Specific embodiments are explained in greater detail below with reference to the figures.

DETAILED DESCRIPTION OF EXAMPLE EMBODIMENTS

The present invention is described below, using the example of an engine system that includes an internal combustion engine whose combustion exhaust gas is conditioned with the aid of a three-way catalytic converter as an exhaust aftertreatment device. In the three-way catalytic converter, oxygen is used as the exhaust gas component to be stored.

Figure 1:
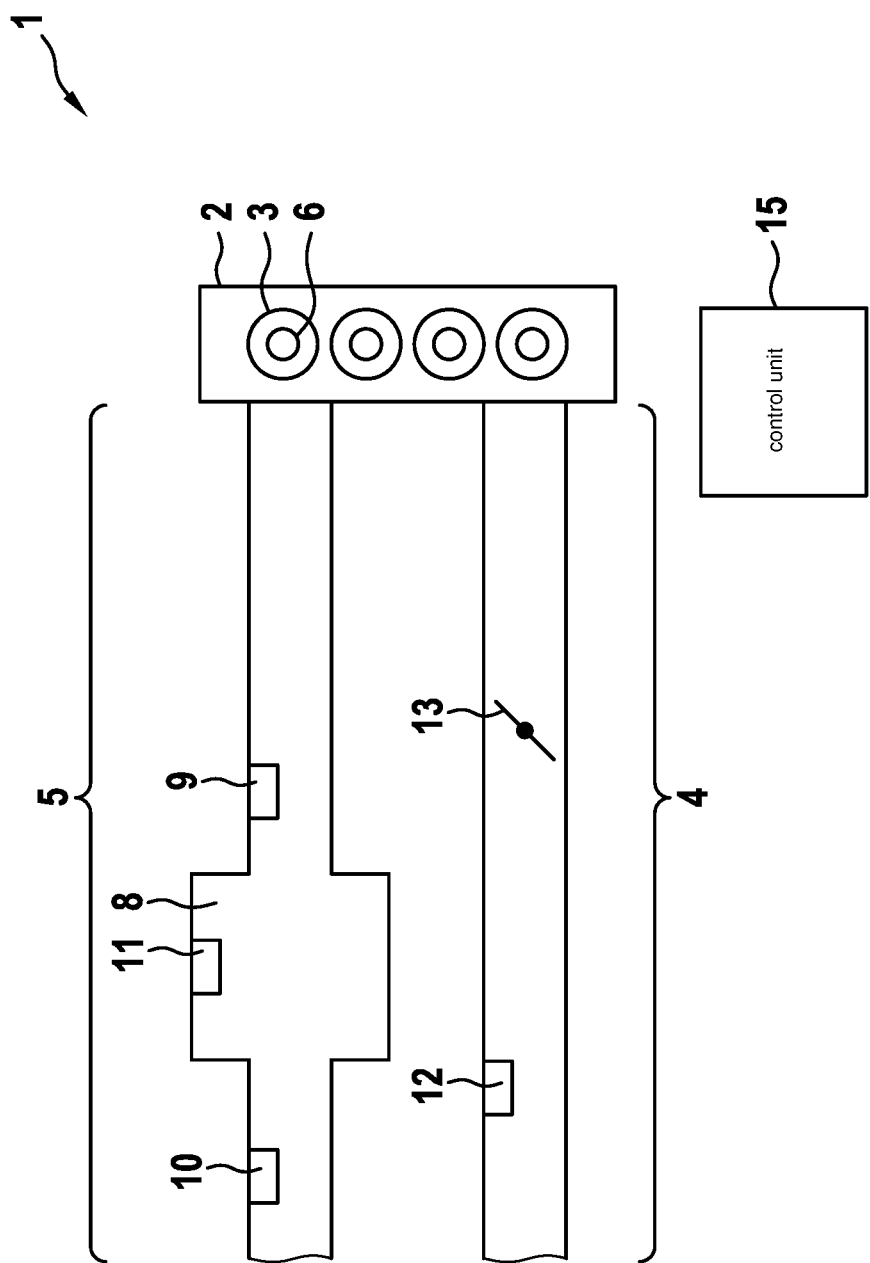
FIG. 1 shows an engine system that includes an internal combustion engine and an exhaust gas system including an exhaust aftertreatment device.

FIG. 1 schematically shows an engine system 1 that includes an internal combustion engine 2 that is designed with a number of cylinders 3 (in the present exemplary embodiment, four cylinders). Fresh air is supplied to cylinders 3 via an air supply system 4 and is provided to each cylinder 3 via controlled intake valves, and combustion exhaust gas is discharged from cylinders 3 via corresponding exhaust valves at each cylinder 3 and via an exhaust gas system 5.

Internal combustion engine 2 is operated in a four-stroke mode in a conventional manner. For this purpose, prior to the start of a combustion stroke, fuel is supplied into cylinders 3, corresponding to a predefined injection quantity, via a respective injection valve 6 in order to form an air-fuel mixture in each of combustion chambers of cylinders 3. During a combustion stroke the air-fuel mixture is ignited and combusted in four-stroke mode, for example using a suitable ignition device, to generate propulsion. Alternatively, instead of an internal combustion engine with direct injection, an internal combustion engine with intake manifold injection or gas-operated internal combustion engines may be used.

Exhaust gas system 5 includes an exhaust aftertreatment device 8 that may be designed as a three-way catalytic converter, for example. A three-way catalytic converter converts the exhaust gas components nitrogen oxides, hydrocarbons, and carbon monoxide on three reaction paths by oxidation with oxygen that is stored in the three-way catalytic converter, and stores oxygen when there is excess oxygen. The operating principle of the three-way catalytic converter is conventional, and is not discussed here in greater detail.

Upstream from exhaust aftertreatment device 8, an upstream exhaust gas sensor 9, in particular in the form of a lambda sensor, is provided which may detect an oxygen content or a hydrocarbon content in the combustion exhaust gas flowing past, and which provides a corresponding upstream lambda value. The lambda value indicates a value of the air-fuel ratio on which the combustion is based. Upstream exhaust gas sensor 9 is preferably designed as a broadband lambda sensor which carries out a measurement of the air-fuel ratio on which the combustion is based and indicates it in the form of an air ratio λ. Upstream exhaust gas sensor 9 allows a measurement of the air-fuel ratio over a wide air ratio range.

Situated downstream from exhaust aftertreatment device 8 is a downstream exhaust gas sensor 10, in particular in the form of a lambda sensor, which detects the oxygen content of the purified combustion exhaust gas flowing past and provides it in the form of a downstream lambda value. Downstream exhaust gas sensor 10 is preferably designed as a so-called jump lambda sensor, via which air ratio A in the range of 1 may be measured particularly accurately due to the fact that the signal of downstream exhaust gas sensors 10 changes abruptly there.

Exhaust aftertreatment device 8 may be provided with a temperature sensor 11 that detects the temperature of exhaust aftertreatment device 8 and provides a corresponding temperature signal.

For controlling the operation of engine system 1, a control unit 15 is provided that detects sensor signals from engine system 1 in order to determine an engine system state. For example, the engine system state may be indicated by state variables of engine system 1 that are determined by sensors. The sensors may include, for example: a fresh air mass flow rate sensor 12 in air supply system 4 for detecting a fresh air mass flow rate, an instantaneous speed of internal combustion engine 2, exhaust gas sensors 9, 10 for detecting the upstream and downstream lambda values, an engine speed sensor, and some more.

Control unit 15 operates internal combustion engine 2 in a conventional manner by controlling position sensors according to an external specification. The external specification may be based, for example, on a driver input torque that is specified via an accelerator pedal. The controllable position sensors may include the injection valves for specifying a fuel quantity to be injected, a throttle valve actuator 13 for setting the air supply into internal combustion engine 2, an ignition device (not shown) in each of cylinders 3, whose ignition timing for igniting the air-fuel mixture is predefined, the time-sequenced valve operations of the intake valves and exhaust valves, and the like.

For providing an engine torque, an appropriate fuel quantity to be injected is computed in control unit 15 and injection valves 6 are appropriately controlled for injecting the computed fuel quantity. At the same time, control unit 15 carries out a filling control, based on the upstream and downstream lambda values that are continuously provided by exhaust gas sensors 9, 10.

Figure 2:
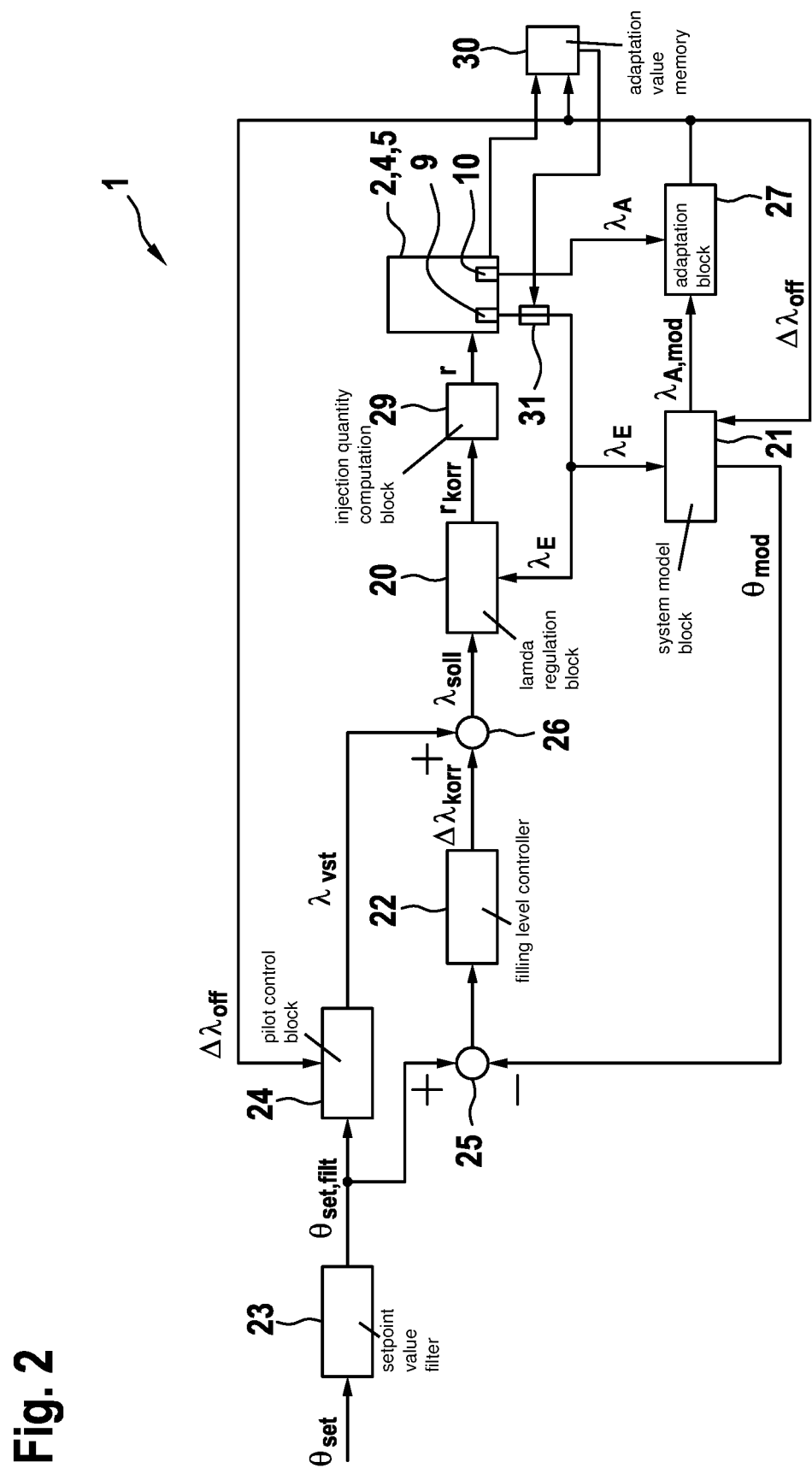
FIG. 2 shows a functional illustration of the lambda regulation for use in the engine system of FIG. 1.

FIG. 2 illustrates a function block diagram which explains the operating principle of the regulation in engine system 1 in greater detail. The filling control is implemented by a filling level controller 22 and a lambda regulation block 20, and is based essentially on setting an instantaneous filling level θ of exhaust aftertreatment device 8 to a predefined filling level setpoint value $\theta_{set}$.

In a three-way catalytic converter, the filling level of exhaust aftertreatment device 8 corresponds to an oxygen charge, which is preferably to be specified according to a predefined operating model, and which is, for example, approximately one-half the maximum possible oxygen charge of exhaust aftertreatment device 8.

Lambda regulation block 20, as a function of a lambda correction $\Delta\lambda_{korr}$ that is predefined by filling level controller 22, provides as a manipulated variable a fuel quantity correction variable $r_{korr}$ which is suitably taken into account, in particular by addition, in an injection quantity computation model of an injection quantity computation block 29, which is likewise executed in control unit 15 and computes a fuel quantity r to be injected.

Since filling level θ of exhaust aftertreatment device 8 cannot be measured, it is modeled with the aid of a system model in a system model block 21. The system model generally includes an input emission model, a catalytic converter model made up of a filling model and an emission model, and an output emission model. In addition, the catalytic converter model includes an algorithm for computing an average filling level θ of exhaust aftertreatment device 8.

The above models are in each case algorithms that are executed in control unit 15. The input emission model is used to convert upstream lambda value $\lambda_E$ of upstream exhaust gas sensor 9 into input variables which represent, for example, concentrations of $O_2$, CO, $H_2$, and HC in the area of upstream exhaust gas sensor 8. Based on the variables computed by the input emission model, a filling level $\theta_{mod}$ of exhaust aftertreatment device 8 and concentrations of the individual exhaust gas components on the output side/downstream from exhaust aftertreatment device 8 are modeled in the filling level model and the output emission model. For adapting the system model, the output lambda model converts the concentrations of the individual exhaust gas components downstream from exhaust aftertreatment device 8, computed using the catalytic converter model, into a modeled output-side lambda value $\lambda_{A,mod}$, which is to correspond to a lambda value downstream from exhaust aftertreatment device 8. The system model may thus be used on the one hand for modeling at least a modeled average filling level $\theta_{mod}$ of exhaust aftertreatment device 8, and on the other hand for providing a modeled downstream lambda value $\lambda_{A,mod}$.

Filling level setpoint value $\theta_{set}$ is prefiltered with the aid of a setpoint value filter 23. By use of prefiltered filling level setpoint value $\theta_{set,filt}$ as a control variable, on the one hand a pilot control and on the other hand a filling control are now controlled. The lambda regulation is based essentially on the result of the filling control, in which a filtered filling level setpoint value $\theta_{set,filt}$ is predefined. The filling control is based on a difference, in particular a difference between filtered filling level setpoint value $\theta_{set,filt}$ and modeled average filling level $\theta_{mod}$, that is ascertained in a differential element 25. The filling control may be carried out with the aid of filling level controller 22, which in particular may be designed as a PI controller, and outputs lambda correction $\Delta\lambda_{korr}$ as a manipulated variable. Average filling level $\theta_{mod}$, which is modeled with the aid of the system model, is thus adjusted to filling level setpoint value $\theta_{set}$, which minimizes the likelihood of breakthroughs toward lean and rich, i.e., the likelihood of departing from the catalytic converter window, and thus results in minimal emissions.

The pilot control takes place in a pilot control block 24, which provides a pilot control lambda value $\lambda_{vst}$ as a function of filtered filling level setpoint value $\theta_{set,filt}$. For computing the particular pilot control lambda value $\lambda_{vst}$ that corresponds to filtered filling level setpoint value $\theta_{set,filt}$, pilot control block 24 contains a physical model that corresponds to a system model that is an inverse to the system model, i.e., a model that assigns a predefined filling level to a preliminary pilot control lambda value.

If upstream lambda signal $\lambda_E$ is distorted by an offset, a lambda offset value $\Delta\lambda_{off}$ is taken into account in pilot control lambda value $\lambda_{vst}$, in particular by adding lambda offset value $\Delta\lambda_{off}$ to a preliminary pilot control lambda value $\lambda'_{vst}$.

Whereas the system model converts upstream lambda value $\lambda_E$, upstream from exhaust aftertreatment device 8, into a modeled (average) oxygen filling level $\theta_{mod}$ of exhaust aftertreatment device 8, the inverse system model of pilot control block 24 converts filtered filling level setpoint value $\theta_{set,filt}$ into a corresponding setpoint value for upstream lambda value $\lambda_E$ (preliminary pilot control lambda value $\lambda'_{vst}$).

For creating the inverse system model, the system model of system model block 21 is preferably analytically inverted. However, a customary exhaust aftertreatment device 8 is a complex, nonlinear system with time-variant system parameters which generally may be represented only by a nonlinear differential equation system. This typically results in the equation system not being analytically solvable for the inverted system model.

Therefore, a numerical inversion of the system model may be provided as an alternative to the analytical inversion of the system model. This is based on predefining an upstream lambda value for the existing system model in an iterative manner, in order to obtain with the aid of the system model a corresponding value for the average filling level of exhaust aftertreatment device 8 which corresponds to desired filling level setpoint value $\theta_{set}$ or filtered filling level setpoint value $\theta_{set,filt}$. If this model value is identical to filling level setpoint value $\theta_{set}$ or to filtered filling level setpoint value $\theta_{set,filt}$, the iteratively predefined upstream lambda value is the value with which a pilot control must be applied in order to achieve the filling level setpoint value.

Thus, for implementation, a second system model (copy) including identical parameters and initial identical state variables is predefined and is iterated with variable upstream lambda values until the absolute value of the difference between the actual filling level, which is computed by the second system model, and desired filling level setpoint value $\theta_{set}$ or filtered filling level setpoint value $\theta_{set,filt}$ is small enough to achieve an accuracy of the pilot control required by the iteration. The value thus found for the upstream lambda value is used as preliminary pilot control lambda value $\lambda'_{vst}$.

Pilot control lambda value $\lambda_{vst}$ of pilot control block 24 and lambda correction $\Delta\lambda_{korr}$ of filling level controller 22 are summed in a summation element 26, and the sum signal represents setpoint lambda value $\lambda_{soll}$ for the upstream lambda value.

Since the input variables of the system model may be subject to uncertainties, and in addition the system model may be inaccurate, this may result in deviations between the variables of filling level $\theta$ of exhaust aftertreatment device 8, modeled with the aid of the system model, and the corresponding actual variables. The model-based regulation of filling level $\theta$ of exhaust aftertreatment device 8 may be appropriately adapted to compensate for the uncertainties. The adaptation may take place, for example, by intervening in the filling control and/or the pilot control.

When suitable operating conditions are present, the adaptation takes place based on a deviation between downstream lambda value $\lambda_{A,mod}$, modeled with the aid of the system model, and measured downstream lambda value $\lambda_A$. There is a need for adaptation when the two values differ, in particular by more than a predefined threshold value. In particular, the adaptation may be carried out incrementally as long as there is a deviation between downstream lambda value $\lambda_{A,mod}$, modeled with the aid of the system model, and measured downstream lambda value $\lambda_A$.

It is advantageous to correct setpoint lambda value $\lambda_{soll}$ for the upstream lambda value, and the filtered setpoint filling level, with a lambda offset value $\Delta\lambda_{off}$ that represents a measure for the need for adaptation. This measure for the need for adaptation results from the difference between downstream lambda value $\lambda_{A,mod}$, modeled with the aid of the system model, and measured downstream lambda value $\lambda_A$, in particular as their difference as lambda offset value $\Delta\lambda_{off}$.

By correcting setpoint lambda value $\lambda_{soll}$ for the upstream lambda value, the lambda regulation may respond immediately to changes in lambda offset value $\Delta\lambda_{off}$.

It is advantageous to smooth the measure for the need for adaptation, i.e., a difference between modeled downstream lambda value $\lambda_{A,mod}$ and measured downstream lambda value $\lambda_A$, with the aid of a filter in an adaptation block 27 in order to obtain lambda offset value $\Delta\lambda_{off}$. The filter may be designed as a PT1 filter, for example, and may include an operating point-dependent time constant that may be taken from a corresponding parameterizable characteristic map, for example. An integrator may optionally be connected downstream from the filter in order to take long-term effects into account. In the steady state, the filtered signal corresponds to the adaptation variable, i.e., lambda offset value $\Delta\lambda_{off}$, and thus, to the uncertainties of the upstream lambda value and the inaccuracies of the system model, i.e., the need for adaptation.

It may be provided that the filtering in adaptation block 27 takes place only when suitable switch-on conditions are present. To allow inaccuracies to be compensated for quickly, it may thus be provided to have the filter carry out an adaptation under less restrictive conditions, in particular whenever a stoichiometric mixture is requested and an exhaust gas lambda in the range of 1 is indicated by the downstream exhaust gas sensor. In addition, it may be provided that an adaptation is carried out only when the signal of downstream exhaust gas sensor 10 is reliable.

During operation of engine system 1, the values of the adaptation variable are stored, corrected, and updated in an adaptation value memory 30 as a function of the operating point. Operating points are determined by one, multiple, or all of the following parameters: load, engine speed, and engine temperature. These parameters are provided by control unit 15. To store the adaptation variable in an adaptation variable characteristic map, it may be provided to associate the operating points with operating ranges, for example in equidistant ranges of the load, the engine speed, the engine temperature, and the like. Depending on the operating range in which the operation of the internal combustion engine is in during an adaptation, a corresponding associated adaptation value is overwritten by the new adaptation value, or is adapted as a function of the newly ascertained adaptation value, for example by weighted application of the interval between the previous adaptation value and the new adaptation value. It is thus possible to carry out the adaptation of the lambda regulation by retrieving the particular adaptation variable as a function of the operating point in order to immediately compensate for inaccuracies, without having to carry out a new adaptation beforehand. A dead time in utilizing the adaptation variable, which results from the control loop between injection and measurement of the downstream lambda value, may thus be avoided.

In addition, control unit 15 may examine the adaptation values, stored in adaptation value memory 30, for a systematic error. This is recognizable when the adaptation values have an average value that represents an adaptation variable offset for all operating points. In particular, an average value of the adaptation variables that are stored for the various operating ranges may be regarded as an offset for the upstream exhaust gas sensor, since it acts independently of the operating point. Such an error may also indicate a leak in exhaust gas discharge system 5. In contrast, adaptation variable differences that deviate from this average value of the adaptation variable are rather to be attributed to modeling inaccuracies of the filling model.

By use of a self-adjustment block 31, which carries out a self-adjustment of exhaust gas sensor 9, in particular a UEGO self-adjustment for a broadband lambda sensor as exhaust gas sensor 9, the upstream lambda value may be corrected directly by the exhaust gas sensor offset value.

Carrying out a self-adjustment in exhaust gas sensors is generally conventional. As an example, a broadband lambda sensor may include a ceramic sensor element that includes an electrochemical pump cell, an electrochemical Nernst cell, a diffusion barrier, and a cavity. The cavity communicates with an exhaust gas via the diffusion barrier. The electrochemical pump cell includes an outer pump electrode that is directly exposed to the exhaust gas, an inner pump electrode situated in the cavity, and a first solid electrolyte situated between the outer pump electrode and the inner pump electrode. The electrochemical Nernst cell includes a Nernst electrode situated in the cavity, a reference electrode situated in a reference gas chamber, and a second solid electrolyte situated between the Nernst electrode and the reference electrode. A pump voltage is appliable between the outer pump electrode and the inner pump electrode so that a pump current flows, a Nernst voltage being measurable between the Nernst electrode and the reference electrode. The self-adjustment provides that the Nernst voltage of the electrochemical Nernst cell is regulated to a predefined setpoint value by setting a pump voltage and/or the pump current of an electrochemical pump cell, and the corrected pump current is ascertained from the pump current and a stored value of the offset current, the corrected pump current representing a measure for the lambda value of the exhaust gas. The stored value of the offset current is used for the self-adjustment, and corresponds to the exhaust gas sensor offset. The offset current is ascertained by determining a comparative voltage that is given either by a pump voltage or by the voltage between one of the pump electrodes and the reference electrode, and by ascertaining a pump current difference between the pump current and a comparative current that is derived from the comparative voltage; and by updating the value of the offset current, based on the pump current difference.

To avoid multiple compensation for the offset of exhaust gas sensor 9, with each adaptation this exhaust gas sensor offset must be corrected for all entries, also in the adaptation variable characteristic map. For this purpose, each of the values of the adaptation variable, stored as a function of the operating point, is acted on, in particular subtracted, using the exhaust gas sensor offset value that is determined with the aid of the self-adjustment, so that a compensation for the offset of exhaust gas sensor 9 that has already taken place is not also corrected by the adaptation variable.

However, a systematic error may also have causes other than an exhaust gas sensor offset of the exhaust gas sensor. If the average adaptation variable has a value not equal to 0, even after the correction by the exhaust gas sensor offset with the aid of the self-adjustment, this may indicate a leak in exhaust gas discharge system 5 or some other error that results in a systematic change in the adaptation variable.

To avoid disturbances of the filling control, in particular an upswing in the regulation, when there is a change in the exhaust gas sensor offset that is found via the self-adjustment, this change may be applied to the adaptation variable, in particular with the aid of a time filter, so that, for example, the values of the adaptation variable in the adaptation variable characteristic map may be corrected in a ramp-like manner in such a way that the values of the adaptation variable take into account the exhaust gas sensor offset of exhaust gas sensor 9 after a certain transition time.

The difference between the values of the adaptation variable and the exhaust gas sensor offset value of the exhaust gas sensor, ascertained by the self-adjustment, remaining after this correction is interpreted as a fuel trim value. A particular fuel trim value for the various operating ranges is available in the adaptation variable characteristic map and is used for a separate diagnostic function, so that a separation between the exhaust gas sensor offset value of exhaust gas sensor 9, determined by the self-adjustment, and a fuel trim error takes place, and a robust diagnosis of errors in the exhaust gas system is thus made possible. Due to the decoupling from the diagnoses, the adaptation of the filling control may be continuously active in a manner of speaking, and thus provides better support than previously for an important requirement of the onboard diagnosis specifications.

What is claimed is:

1. A method for operating an engine system that includes an internal combustion engine and an exhaust aftertreatment device in an exhaust gas discharge system, the method comprising the following steps:
    based on a deviation between a modeled lambda value downstream of the exhaust gas aftertreatment device and a sensed lambda value downstream of the exhaust gas after treatment device, obtaining a correction value for a lambda setpoint value;
    carrying out a filling control to regulate a filling level of the exhaust aftertreatment device as a function of (a) a deviation of a modeled filling level that is modeled based on the modeled lambda value downstream of the exhaust gas aftertreatment device from a predefined filling level setpoint value and (b) the correction value;
    setting the lambda setpoint value based on (a) the filling control and (b) the correction value;
    carrying out a lambda regulation based on the lambda setpoint value;
    updating a stored adaptation value as a function of an instantaneous operating range of the engine system and the correction value; and
    carrying out a subsequent further filling control and subsequent further lambda regulation based on the updated stored adaptation value.

2. The method as recited in claim 1, wherein the updated stored adaptation value is selected for the further filling control as a function of the operating range of the internal combustion engine at a time at which the further filling control is carried out.

3. The method as recited in claim 1, wherein the filling control is continuously adapted using a plurality of stored adaptation values, the plurality of stored adaptation values including the updated stored adaptation value.

4. The method as recited in claim 1, wherein the instantaneous operating range, as a function of which the stored adaptation value is updated, is based on at least one of the following variables: load, engine speed, engine temperature.

5. The method as recited in claim 1, wherein the modeled lambda value is modeled based on a sensed lambda value upstream of the exhaust gas aftertreatment device.

6. A method for diagnosing components of an exhaust gas discharge system that includes an exhaust gas aftertreatment device at which an exhaust gas sensor is situated, comprising the following steps:
- carrying out a filling control to regulate a filling level of the exhaust aftertreatment device as a function of a predefined filling level setpoint value, a lambda setpoint value for a lambda regulation being predefined as a manipulated variable;
- adapting the filling control using an adaptation variable that indicates a correction value for the lambda setpoint value, wherein at least one of the lambda regulation and the filling control is based on values of the exhaust gas sensor;
- updating one of a plurality of stored adaptation values as a function of a value of the adaptation variable for an instantaneous operating range;
- associating an error in the exhaust gas discharge system as a function of the plurality of stored adaptation values, wherein the plurality of stored adaptation values are stored in association with respective operating ranges of the internal combustion engine; and
- carrying out a self-adjustment for the values of the exhaust gas sensor based on the plurality of stored adaptation values.

7. The method as recited in claim 6, wherein:
the exhaust gas sensor is situated upstream from the exhaust aftertreatment device;
the self-adjustment is carried out to obtain an exhaust gas sensor offset value, via which a lambda value provided from the exhaust gas sensor to the lambda regulation is corrected;
the stored adaptation values are corrected as a function of the exhaust gas sensor offset value to obtain particular fuel trim values that are used as remaining adaptation values for the filling control; and
at least one of:
(i) a systematic error in the exhaust gas discharge system is recognized when an average value of the fuel trim values is greater than a predefined threshold value; and
(ii) a model inaccuracy of a filling model of the filling control is recognized when a deviation of the adaptation values from an average value of the adaptation values exceeds a predefined threshold value.

8. A control unit configured to operate an engine system, the engine system including an internal combustion engine and an exhaust aftertreatment device, the control unit configured to:
- based on a deviation between a modeled lambda value downstream of the exhaust gas aftertreatment device and a sensed lambda value downstream of the exhaust gas after treatment device, obtain a correction value for a lambda setpoint value;
- carry out a filling control to regulate a filling level of the exhaust aftertreatment device as a function of (a) a deviation of a modeled filling level that is modeled based on the modeled lambda value downstream of the exhaust gas aftertreatment device from a predefined filling level setpoint value and (b) the correction value;
- set the lambda setpoint value based on (a) the filling control and (b) the correction value;
- carry out a lambda regulation based on the lambda setpoint value;
- update a stored adaptation value as a function of an instantaneous operating range of the engine system and the correction value; and
- carry out a subsequent further filling control and subsequent further lambda regulation based on the updated stored adaptation value.

9. A non-transitory machine-readable memory medium on which is stored a computer program for operating an engine system that includes an internal combustion engine and an exhaust aftertreatment device in an exhaust gas discharge system, the computer program, when executed by a computer, causing the computer to perform the following steps:
- based on a deviation between a modeled lambda value downstream of the exhaust gas aftertreatment device and a sensed lambda value downstream of the exhaust gas after treatment device, obtaining a correction value for a lambda setpoint value;
- carrying out a filling control to regulate a filling level of the exhaust aftertreatment device as a function of (a) a deviation of a modeled filling level that is modeled based on the modeled lambda value downstream of the exhaust gas aftertreatment device from a predefined filling level setpoint value and (b) the correction value;
- setting the lambda setpoint value based on (a) the filling control and (b) the correction value;
- carrying out a lambda regulation based on the lambda setpoint value;
- updating a stored adaptation value as a function of an instantaneous operating range of the engine system and the correction value; and
- carrying out a subsequent further filling control and subsequent further lambda regulation based on the updated stored adaptation value.

* * * * *